(12) United States Patent
Knauerhase

(10) Patent No.: US 12,462,889 B2
(45) Date of Patent: Nov. 4, 2025

(54) MEMORY VERIFICATION USING PROCESSING-IN-MEMORY

(71) Applicant: Advanced Micro Devices, Inc., Santa Clara, CA (US)

(72) Inventor: Robin Conradine Knauerhase, Portland, OR (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,558

(22) Filed: Dec. 27, 2022

(65) Prior Publication Data

US 2024/0212777 A1   Jun. 27, 2024

(51) Int. Cl.
   *G11C 29/14* (2006.01)
   *G11C 29/12* (2006.01)

(52) U.S. Cl.
   CPC ...... *G11C 29/14* (2013.01); *G11C 2029/1208* (2013.01)

(58) Field of Classification Search
   CPC ............... G11C 29/14; G11C 2029/1208
   See application file for complete search history.

(56) References Cited

U.S. PATENT DOCUMENTS

| | | | | |
|---|---|---|---|---|
| 2014/0095946 | A1* | 4/2014 | Mozak | G11C 29/56 |
| | | | | 714/718 |
| 2022/0122684 | A1* | 4/2022 | Pecha | G11C 29/4401 |
| 2023/0315599 | A1* | 10/2023 | Schaefer | G06F 11/27 |
| | | | | 714/718 |

* cited by examiner

*Primary Examiner* — Mark D Featherstone
*Assistant Examiner* — Rong Tang
(74) *Attorney, Agent, or Firm* — FIG. 1 Patents

(57) ABSTRACT

Memory verification using processing-in-memory is described. In accordance with the described techniques, memory testing logic is loaded into a processing-in-memory component. The processing-in-memory component executes the memory testing logic to test a memory. An indication is output of a detected fault in the memory based on testing the memory.

20 Claims, 4 Drawing Sheets

MEMORY VERIFICATION USING PROCESSING-IN-MEMORY

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased computer performance while reducing data transfer latency as compared to conventional computer architectures that implement remote processing hardware.

DETAILED DESCRIPTION

Overview

Figure 1:
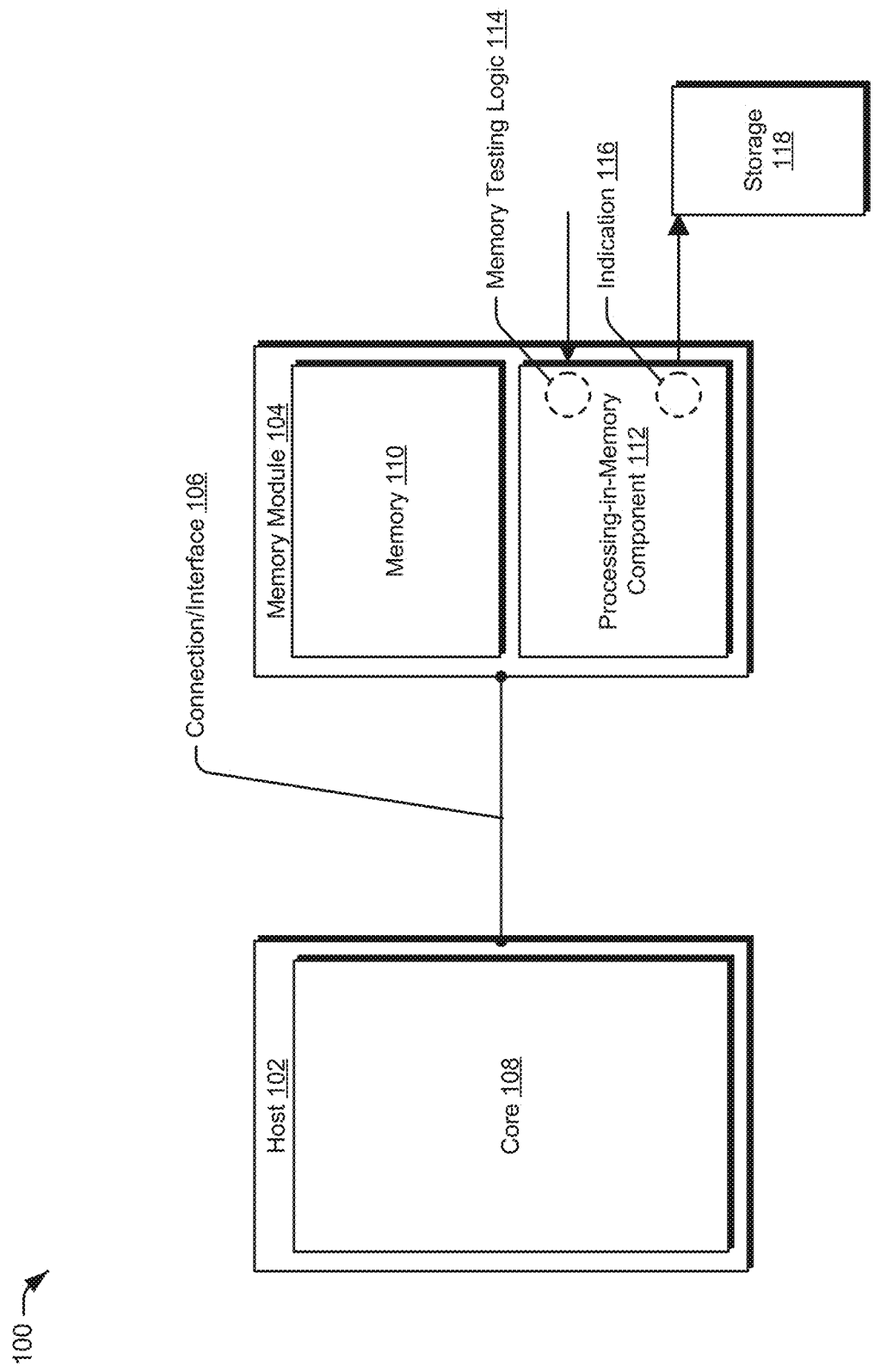
FIG. 1 is a block diagram of a non-limiting example system having a host with a core and a memory module with a memory and a processing-in-memory component.

Faults in memory of a device cause a variety of undesirable issues ranging from unexpected/degraded device performance to crashes and unplanned reboots of the device. In order to avoid such undesirable issues, the memory is tested for errors or faults, and its operational performance is verified if no errors or faults (or fewer than a threshold number) are identified based on the testing. One conventional approach for testing the memory leverages memory diagnostic software which causes a processing unit of the device to perform operations relative to portions of the memory that verify normal operation of the portions of the memory. However, testing the memory using memory diagnostic software in this manner is disruptive to normal device/system operations, consumes processing resources and associated power, increases memory bus traffic and contention, etc. Because of these high costs, use of memory diagnostic software is not efficient for verifying high-bandwidth memory (HBM) or in high-performance computing (HPC) environments.

To overcome these problems, memory verification using processing-in-memory is described. In accordance with the described techniques, a system includes a memory module having a memory and a processing-in-memory component. In one or more implementations, the memory module is coupled via an interconnect to a core, e.g., of a host processor. In accordance with the described techniques, though, the processing-in-memory component verifies portions of the memory by executing memory testing logic without causing traffic over the connection between the core and the memory module. Notably, the processing-in-memory component is topologically closer to the memory than the core of the host processor in terms of data communication pathways.

In one or more implementations, the processing-in-memory component receives the memory testing logic which is loaded into the processing-in-memory component. In some examples, the memory testing logic is received from the core of the host processor via the interconnect. In other examples, the memory testing logic is available in a dedicated portion of the memory (e.g., "fused" logic to reduce a likelihood of errors) or another portion of the system.

The memory testing logic includes instructions, and the processing-in-memory component executes the instructions which, in at least one variation, causes the processing-in-memory component to iteratively write test values to portions of the memory, read values from the portions of the memory, and compare the test values written to the portions of the memory with the values read from the portions of the memory. For example, the processing-in-memory component writes a test value to a bank of the memory and then reads a value from the bank of the memory. In order to test the bank of the memory for errors or faults, the test value (e.g., the expected value) is compared to the value read from the bank of the memory.

If a result of this comparison confirms that the value read from the bank of the memory is the same as the test value written to the bank of the memory, then operation of the bank of the memory is verified and the processing-in-memory component writes the test value to an additional bank of the memory, e.g., to verify operation of the additional bank of the memory. However, if the result of the comparison indicates that the value read from the bank of the memory is not the same as the test value written to the bank of the memory, then this corresponds to a detected fault in the bank of the memory. In this scenario, an entry is added to an error log that includes one or more of the values read from the bank of the memory, the expected value (e.g., the test value), and a location of the bank of the memory having the detected fault.

An indication of the detected fault is output (e.g., to a decision engine) such that a response to the detected fault is initiable. By testing the memory within the memory module using the processing-in-memory component, the described techniques do not cause additional traffic on the interconnect which reduces contention. This is not possible in conventional approaches to testing memory which utilize the core of the remote host processor to perform operations to test the memory. Furthermore, the described techniques also save cycles of the remote host processor which reduces power consumption and/or frees up the core for execution of other tasks relative to the conventional approaches.

In some aspects, the techniques described herein relate to a system including: a memory of a memory module, and a processing-in-memory component of the memory module to: receive memory testing logic, execute the memory testing logic in the processing-in-memory component to test the memory, and output an indication of a detected fault based on testing the memory.

In some aspects, the techniques described herein relate to a system, wherein the memory module includes one or more memories and one or more processing-in-memory components.

In some aspects, the techniques described herein relate to a system, further including a decision engine to initiate a response to the detected fault.

In some aspects, the techniques described herein relate to a system, wherein the response is ignoring the detected fault.

In some aspects, the techniques described herein relate to a system, wherein the response is ceasing use of a portion of the memory associated with the detected fault.

In some aspects, the techniques described herein relate to a system, wherein the memory testing logic is executed by the processing-in-memory component based on the memory being idle.

In some aspects, the techniques described herein relate to a system, wherein the memory testing logic is executed by the processing-in-memory component based on administrative rules for periodically verifying the memory.

In some aspects, the techniques described herein relate to a system, wherein the memory testing logic is executed by the processing-in-memory component based on detection of an event.

In some aspects, the techniques described herein relate to a system, wherein the memory is a non-volatile memory.

In some aspects, the techniques described herein relate to a system, wherein the memory is a volatile memory.

In some aspects, the techniques described herein relate to a system, wherein the volatile memory is a dynamic random-access memory.

In some aspects, the techniques described herein relate to a method including: loading memory testing logic into a processing-in-memory component, executing, by the processing-in-memory component, the memory testing logic to test a memory, and outputting an indication of a detected fault in the memory based on testing the memory.

In some aspects, the techniques described herein relate to a method, wherein executing the memory testing logic to test the memory causes the processing-in-memory component to perform operations including: writing, by the processing-in-memory component, a value to a cell of the memory, reading, by the processing-in-memory component, a value from the cell of the memory, and comparing, by the processing-in-memory component, the value written to the cell of the memory with the value read from the cell of the memory.

In some aspects, the techniques described herein relate to a method, wherein the memory testing logic is loaded from a host that includes a core, and wherein executing the memory testing logic does not cause traffic on a direct connection between the memory and the host.

In some aspects, the techniques described herein relate to a method, wherein the core is at least one of a central processing unit or a graphics processing unit.

In some aspects, the techniques described herein relate to a method, wherein the memory testing logic is loaded from the memory.

In some aspects, the techniques described herein relate to a method, wherein the processing-in-memory component tests the memory according to a pattern of memory accesses described by the memory testing logic.

In some aspects, the techniques described herein relate to a method including: accessing, by a processing-in-memory component, one or more portions of a memory to test the memory, the one or more portions of the memory accessed according to a memory access pattern described by memory testing logic, and outputting an indication of whether the one or more portions of the memory are faulty or not faulty based on comparing values written to the one or more portions of the memory with values read from the one or more portions of the memory.

In some aspects, the techniques described herein relate to a method, wherein the one or more portions of the memory are accessed by the processing-in-memory component based on at least one of administrative rules for periodically verifying the memory, detection of an event, or the memory being idle.

In some aspects, the techniques described herein relate to a method, further including loading the memory testing logic into the processing-in-memory component from the memory.

FIG. 1 is a block diagram of a non-limiting example system 100 having a host with a core and having a memory module with a memory and a processing-in-memory component. In particular, the system 100 includes host 102 and memory module 104 which are connected via connection/interface 106. In one or more implementations, the host 102 includes core 108, and the memory module 104 includes memory 110 and processing-in-memory component 112.

In accordance with the described techniques, the host 102 and the memory module 104 are coupled to one another via a wired or wireless connection which is illustrated as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or the core 108 include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the host 102 includes more than one core 108, e.g., the host 102 is a multi-core processor.

In one or more implementations, the memory module 104 is a circuit board (e.g., a printed circuit board), on which the memory 110 is mounted and includes the processing-in-memory component 112. The processing-in-memory component 112 includes one or more in-memory processors. In some variations, one or more integrated circuits of the memory 110 are mounted on the circuit board of the memory module 104, and the memory module 104 includes one or more processing-in-memory components 112. Examples of the memory module 104 include, but are not limited to, a TransFlash memory module, a single in-line memory module (SIMM), and a dual in-line memory module (DIMM). In one or more implementations, the memory module 104 is a single integrated circuit device that incorporates the memory 110 and the processing-in-memory component 112 on a single chip. In some examples, the memory module 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device, e.g., by the core 108 of the host 102 and/or by the one or more in-memory processors of the processing-in-memory component 112. In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM). In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or in addition, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is configurable in a variety of ways that support memory verification (e.g., of the memory 110) using processing-in-memory without departing from the spirit or scope of the described techniques.

Broadly, the processing-in-memory component 112 is configured to process processing-in-memory instructions using the one or more in-memory processors, e.g., received from the core 108 via the connection/interface 106. The processing-in-memory component 112 is representative of a processor with example processing capabilities ranging from relatively simple (e.g., an adding machine) to relatively complex (e.g., a CPU/GPU compute core). In an example, the one or more in-memory processors of processing-in-memory component 112 processes the instructions using data stored in the memory 110.

Processing-in-memory using in-memory processors contrasts with standard computer architectures which obtain data from memory, communicate the data to a remote processing unit (e.g., the core 108 of the host 102), and process the data using the remote processing unit (e.g., using the core 108 of the host 102 rather than the one or more in-memory processors of the processing-in-memory component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., the core 108 of the host 102) is further away from the memory 110 than the processing-in-memory component 112. As a result, these standard computer architectures suffer from increased data transfer latency, reduced data communication bandwidth, and increased data communication energy, particularly when the volume of data transferred between the memory and the remote processing unit is large, which can also decrease overall computer performance. Thus, the processing-in-memory component 112 enables increased computer performance while reducing data transfer energy as compared to standard computer architectures that implement remote processing hardware. Further, the processing-in-memory component 112 alleviates memory performance and energy bottlenecks by moving one or more memory-intensive computations closer to the memory 110. Although the processing-in-memory component 112 is illustrated as being disposed within the memory module 104, it is to be appreciated that in some examples, the described benefits of memory verification using processing-in-memory are realizable through near-memory processing implementations in which the processing-in-memory component 112 is disposed in closer proximity to the memory 110 (e.g., in terms of data communication pathways) than the core 108 of the host 102.

The processing-in-memory component is illustrated as receiving memory testing logic 114 which represents instructions that are executable by the processing-in-memory component 112 to cause the one or more in-memory processors of the processing-in-memory component 112 to perform operations relative to the memory 110. In accordance with the described techniques, execution of the memory testing logic 114 causes the one or more in-memory processors of the processing-in-memory component 112 to verify (or test) operation of one or more portions (e.g., cells or banks) of the memory 110. In one example, the processing-in-memory component 112 receives the memory testing logic 114 from the host 102 and/or the core 108 via the connection/interface 106. In another example, the processing-in-memory component 112 receives (e.g., loads) the memory testing logic 114 from a dedicated portion of the memory 110 (e.g., an externally-non-addressable memory of a bank of the memory 110). In a further example, the processing-in-memory component 112 receives/loads the memory testing logic 114 from a defined location within the system 100, e.g., without causing traffic to/from the memory module 104 on the connection/interface 106.

Consider an example in which the memory testing logic 114 includes multiple sets of instructions that are each executable by the one or more in-memory processors of the processing-in-memory component 112 to cause the processing-in-memory component 112 to test the memory 110 in different ways, with different levels of certainty, using different test values in different increments, and so forth. Additionally or alternatively, the processing-in-memory component 112 executes the memory testing logic 114 according to one or more administrative rules or policies that define when and how to verify operation of the memory 110. Examples of when to verify the operation of the memory 110 include, but are not limited to, upon startup of the system 100, during planned or unplanned maintenance of the system 100, periodically (e.g., hourly, daily, weekly, etc.), while one or more portions of the memory 110 are idle, while one or more portions of the memory 110 are not idle, randomly, upon detection of an event (e.g., abnormal operation of the system 100), during investigation/debugging of itinerant failures in the memory 110, when ambient conditions of the system 100 exceed one or more threshold levels, etc.

Examples of how to verify the operation of the memory 110 include, but are not limited to, using particular test values in particular increments, in a particular number of invocations or iterations, using particular testing sizes (e.g., in bits, in bytes, words, etc.), according to a particular test pattern, specific portions of the memory 110 to be tested, and so forth. In one or more implementations, test parameters for verifying the operation of the memory 110 vary based on testing difficulty, runtime conditions, in order to avoid contention, and so forth. In examples in which the host 102 is a multi-core processor and includes multiple cores 108 and/or the memory module 104 includes more than one memory 110 and more than one processing-in-memory component 112, the administrative rules or policies also define a particular core 108 and/or a particular memory 110 to test by causing a particular processing-in-memory component 112 to execute instructions included in the memory testing logic 114. It is to be appreciated that in various implementations the administrative rules or policies are more general (e.g., validate operation of the memory 110 if the memory 110 is idle) and/or more specific (e.g., test a particular portion of the memory 110 as part of investigation/debugging of itinerant failures in the memory 110).

Since the processing-in-memory component 112 executes the memory testing logic 114 to test the memory 110 within the memory module 104, the one or more in-memory processors of the processing-in-memory component 112 are capable of verifying operation of the memory 110 with minimal impact on the system 100 (e.g., without invalidating caches of the system 100 or causing traffic on the connection/interface 106). For instance, the processing-in-memory component 112 verifies operation of the memory 110 "in the background" with respect to the host 102 and the core 108 which saves cycles of the host 102 and/or the core 108, reduces memory bus traffic (e.g., reduces traffic on the connection/interface 106), and reduces power consumption relative to using the host 102 and/or the core 108 to verify operation of the memory 110. Notably, because the processing-in-memory component 112 is closer to the memory 110 than the core 108 of the host 102 in terms of data communication pathways, a verification of operation of the memory 110 is generally completable in a shorter amount of time when the verification is performed by the processing-in-memory component 112 relative to performing the verification using the core 108 of the host 102. This shorter amount of time corresponds to a faster resolution of a detected fault or error in the memory 110 and also faster detection which reduces a risk of propagating the fault or error in the memory 110, e.g., through a large dataset.

Consider an example in which the memory testing logic 114 describes instructions that cause the one or more in-memory processors of the processing-in-memory component 112 to iteratively write values to particular locations (e.g., particular banks, cells, etc.) in the memory 110, read values from the particular locations in the memory 110, and compare the values written with the values read to verify operation of the particular locations in the memory 110. In this example, in each iteration, the instructions of the memory testing logic 114 cause the one or more in-memory processors of the processing-in-memory component 112 to store a test value in a first register and move the test value from the first register to a portion of the memory 110 defined by the administrative rules or policies. The instructions described by the memory testing logic 114 then cause the one or more in-memory processors of the processing-in-memory component 112 to move a value in the portion of the memory 110 into a second register. The first register is compared to the second register, and if a value (e.g., the test value) in the first register is different from a value in the second register, then an entry is added to an error log that includes a location of the portion of the memory 110, an expected value (e.g., the test value), and a value included in the second register. In one example, the entry also includes a date, a time, and ambient conditions of the portion of the memory 110 at the time on the date. Thus, the one or more in-memory processors of the processing-in-memory component 112 execute the instructions described by the memory testing logic 114 which causes the processing-in-memory component 112 to output an indication 116.

For example, the processing-in-memory component 112 outputs the indication 116 by writing the indication 116 to a register of the memory module 104 and/or the system 100. For instance, the processing-in-memory component 112 outputs the indication 116 by writing the indication 116 to a particular portion of the memory 110. In an example, the processing-in-memory component 112 outputs the indication 116 by writing the indication 116 to a memory at a defined location within the system 100, e.g., without causing traffic to/from the memory module 104 on the connection/interface 106. In another example, the processing-in-memory component 112 outputs the indication 116 by writing the indication 116 to a memory of the host 102 and/or the core 108, e.g., via the connection/interface 106.

In some examples, the processing-in-memory component 112 outputs the indication 116 by writing the indication 116 to storage 118 of the system 100. The storage 118 is a device or system that is used to store information, such a volatile memory, a non-volatile memory, a cache, a register, and so forth. In an example, the storage 118 is included in (or accessible to) the memory module 104. The storage 118 at least temporarily stores the indication 116.

Continuing the previous example, the indication 116 indicates a detected error or fault in the memory 110 (e.g., in the portion of the memory 110). In an example, the indication 116 describes the information included in the error log entry (e.g., the location of the portion of the memory 110, the expected value, the value included in the second register, etc.). In another example, the indication 116 describes the error log and each entry included in the error log. In one or more implementations, the indication 116 describes a list of detected errors or faults in the memory 110 and corresponding portions or banks of the memory 110 in which the errors or faults are detected. In an example in which the memory 110 corresponds to or includes volatile memory, the indication 116 describes a list of DRAM modules which are associated with at least one detected error or fault.

Figure 2:
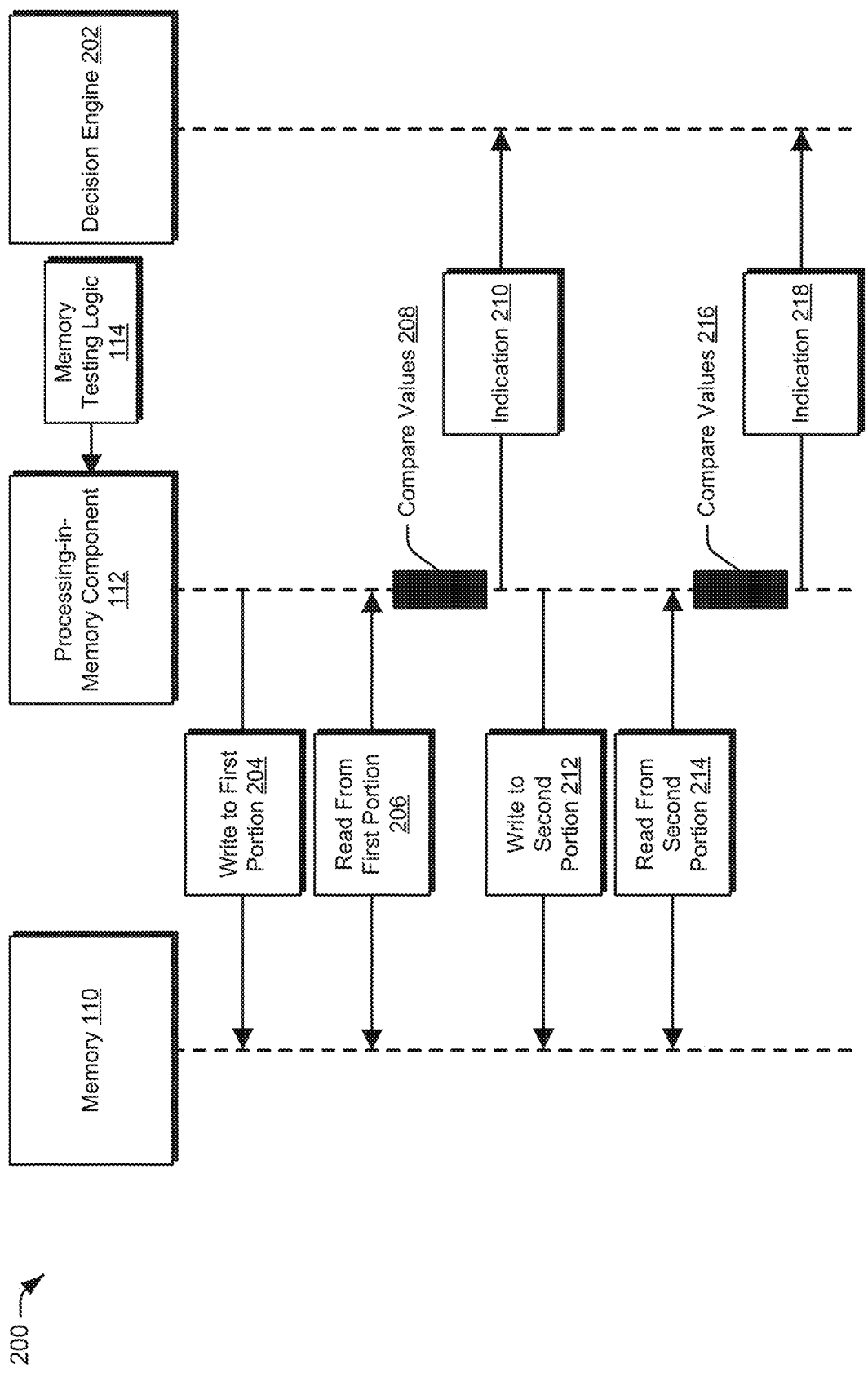
FIG. 2 depicts a non-limiting example of using processing-in-memory for memory verification.

FIG. 2 depicts a non-limiting example 200 of using processing-in-memory for memory verification.

The illustrated example 200 includes the memory 110, the processing-in-memory component 112, and a decision engine 202. In one or more implementations, the decision engine 202 is configured to initiate a response to one or more detected errors or faults in the memory 110. For example, the decision engine 202 is an application, firmware, an operating system, or an agent which is capable of receiving the indication 116 and initiating a response to a detected error or fault in the memory 110 described by the indication 116. In some examples, the decision engine 202 passively receives the indication 116 such as in an example in which the one or more in-memory processors of the processing-in-memory component 112 execute the instructions described by the memory testing logic 114 which causes the processing-in-memory component 112 to output the indication 116 by writing the indication 116 to a memory or a register of the decision engine 202. In other examples, the decision engine 202 actively receives the indication 116 such as in an example in which the one or more in-memory processors of the processing-in-memory component 112 execute the instructions described by the memory testing logic 114 which causes the processing-in-memory component 112 to output the indication 116 by writing the indication 116 to a memory or a register of the system 100 and the decision engine 202 receives the indication 116 by reading the indication 116 from the memory or the register of the system 100. For example, the decision engine 202 receives the indication 116 by reading the indication 116 from the storage 118. In this example, the storage 118 is accessible to (or included in) the decision engine 202. Examples of a response to a detected error or fault in a portion of the memory 110 include, but are not limited to, ignoring the detected error or fault, removing electrical power supplied to the portion of the memory 110, ceasing use of the portion of the memory 110, alerting a technician of the detected error or fault in the portion of the memory 110, etc.

Consider an example in which the processing-in-memory component 112 loads and executes instructions in the memory testing logic 114 which causes the one or more in-memory processors of the processing-in-memory component 112 to write a test value (e.g., move the test value from a first register) to a first portion 204 of the memory 110. In various implementations, the first portion of the memory 110 is representative of a bank of the memory 110, a cell of the memory 110, a block of the memory 110, etc. For instance, if a memory bank of the memory 110 is not idle, then the processing-in-memory component 112 is capable of transparently testing operation of the memory bank by replacing the test value with a current value or reading the current value, saving the current value, writing the test value to the memory bank, reading a value from the memory bank to compare with the test value, and writing the saved current value to the memory bank.

Continuing the previous example, after writing the test value to the first portion 204 of the memory 110, the processing-in-memory component 112 reads a value (e.g., moves the value to a second register) from the first portion 206 of the memory 110. In order to test operation of the first portion of the memory 110, the instructions included in the memory testing logic 114 cause the one or more in-memory processors of the processing-in-memory component 112 to compare the values 208 (e.g., compare the first register with the second register) by determining whether or not the value read from the first portion 206 of the memory 110 is the same as the test value written to the first portion 204 of the memory 110. For instance, the processing-in-memory component 112 outputs an indication 210 (e.g., by writing the indication 210 to a memory/register of the decision engine 202) as describing a result of comparing the values 208 and a location of the first portion of the memory 110. In some examples, the processing-in-memory component 112 outputs the indication 210 by writing the indication 210 to the storage 118.

In one example in which the result of comparing the values 208 indicates that the test value written to the first portion 204 of the memory 110 is the same as the value read from the first portion 206 of the memory 110, the processing-in-memory component 112 does not output the indication 210 (e.g., does not write the indication 210 to the memory/register of the decision engine 202) because the result of comparing the values 208 corresponds to normal operation of the first portion of the memory 110. In another example in which the result of comparing the values 208 indicates that the test value written to the first portion 204 of the memory 110 is the same as the value read from the first portion 206 of the memory 110, the processing-in-memory component 112 outputs the indication 210 (e.g., by writing the indication 210 to the memory/register of the decision engine 202 and/or the storage 118) as describing the result of comparing the values 208 and the location of the first portion of the memory 110 for receipt by the decision engine 202. In this other example, the decision engine 202 receives the indication 210 (e.g., reads the indication 210 from the storage 118) and does nothing in response to receiving the indication 210 (e.g., ignores the indication 210), updates a memory testing log in response to receiving the indication 210, etc.

In an example in which the result of comparing the values 208 indicates that the test value written to the first portion 204 of the memory 110 is not the same as the value read from the first portion 206 of the memory 110, the processing-in-memory component 112 outputs the indication 210 (e.g., by writing the indication 210 to the memory/register of the decision engine 202 and/or the storage 118) as describing a detected error or fault in the first portion of the memory 110 and the location of the first portion of the memory 110 for receipt by the decision engine 202. The decision engine 202 receives the indication 210 (e.g., reads the indication from the storage 118) and initiates a response to the detected error or fault in the first portion of the memory 110. For instance, the decision engine 202 adds the first portion of the memory 110 to a list of portions of memories that are each associated with at least one detected error or fault.

The processing-in-memory component 112 executes the instructions included in the memory testing logic 114 which causes the one or more in-memory processors of the processing-in-memory component 112 to write a test value (e.g., move the test value from a first register) to a second portion 212 of the memory 110. For example, the test value written to the second portion 212 of the memory 110 is the same as or different from the test value written to the first portion 204 of the memory 110. After writing the test value to the second portion 212 of the memory 110, the one or more in-memory processors of the processing-in-memory component 112 read a value (e.g., move the value to a second register) from the second portion 214 of the memory 110. In order to test operation of the second portion of the memory 110, the instructions included in the memory testing logic 114 cause the one or more in-memory processors of the processing-in-memory component 112 to compare the values 216 (e.g., compare the first register with the second register). Comparing the values 216 indicates whether or not the value read from the second portion 214 of the memory 110 is the same as the test value written to the second portion 212 of the memory 110.

In an example, the processing-in-memory component 112 outputs an indication 218 (e.g., by writing the indication 218 to a memory/register of the decision engine 202 and/or the storage 118) as describing a result of comparing the values 216 and a location of the second portion of the memory 110. In this example, the result of comparing the values 216 is a detected error or fault in the second portion of the memory 110 because the test value written to the second portion 212 of the memory 110 is not the same as the value read from the second portion 214 of the memory 110. The decision engine 202 receives the indication 218 (e.g., reads the indication 218 from the storage 118) and initiates a response to the detected error or fault in the second portion of the memory 110. In one example, the decision engine 202 adds the second portion of the memory 110 to the list of portions of memories that are each associated with at least one detected error or fault.

Figure 3:
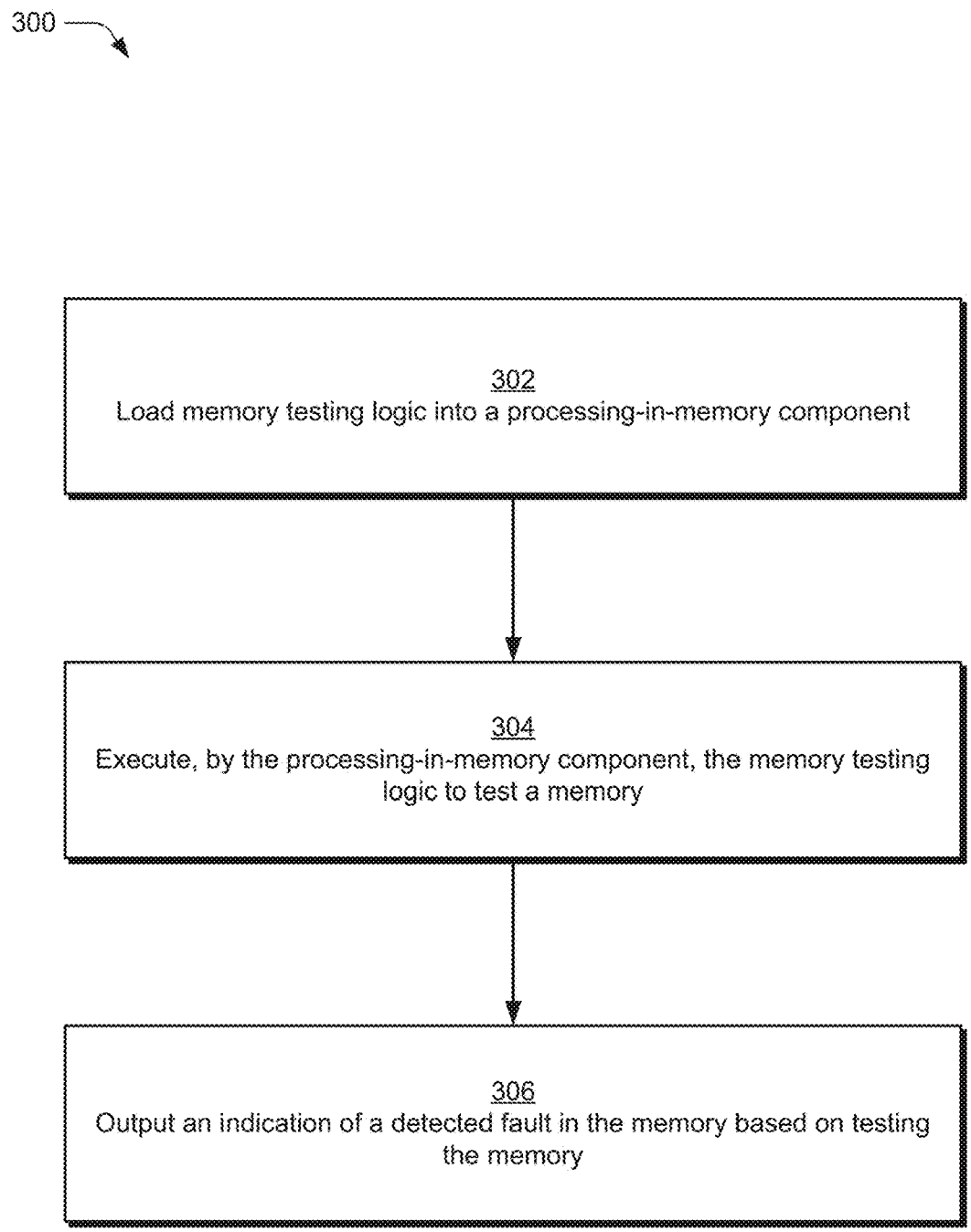
FIG. 3 depicts a procedure in an example implementation of memory verification using processing-in-memory.

FIG. 3 depicts a procedure 300 in an example implementation of memory verification using processing-in-memory.

Memory testing logic is loaded into a processing-in-memory component (block 302). By way of example, the memory testing logic 114 is loaded from the host 102, a dedicated portion of the memory 110, a particular location within the system 100, and so forth. For instance, the memory testing logic 114 is loaded into the processing-in-memory component 112 in accordance with the administrative rules or policies that define when and how to verify operation of the memory 110.

The memory testing logic is executed by the processing-in-memory component to test a memory (block 304). For example, the memory testing logic 114 includes instructions and executing the instructions included in the memory testing logic 114 causes the processing-in-memory component 112 to test the memory 110. In one or more implementations, the processing-in-memory component 112 tests the memory 110 by writing a test value to a portion of the memory 110 and then the processing-in-memory component 112 reads a value from the portion of the memory 110.

An indication of a detected fault in the memory is output based on testing the memory (block 306). In an example, the processing-in-memory component 112 compares the test value written to the portion of the memory 110 and the value read from the portion of the memory 110. In this example, the processing-in-memory component 112 outputs the indication as describing the detected fault in the memory 110 based on determining that the value read from the portion of the memory 110 is different from the test value written to the portion of the memory 110.

Figure 4:
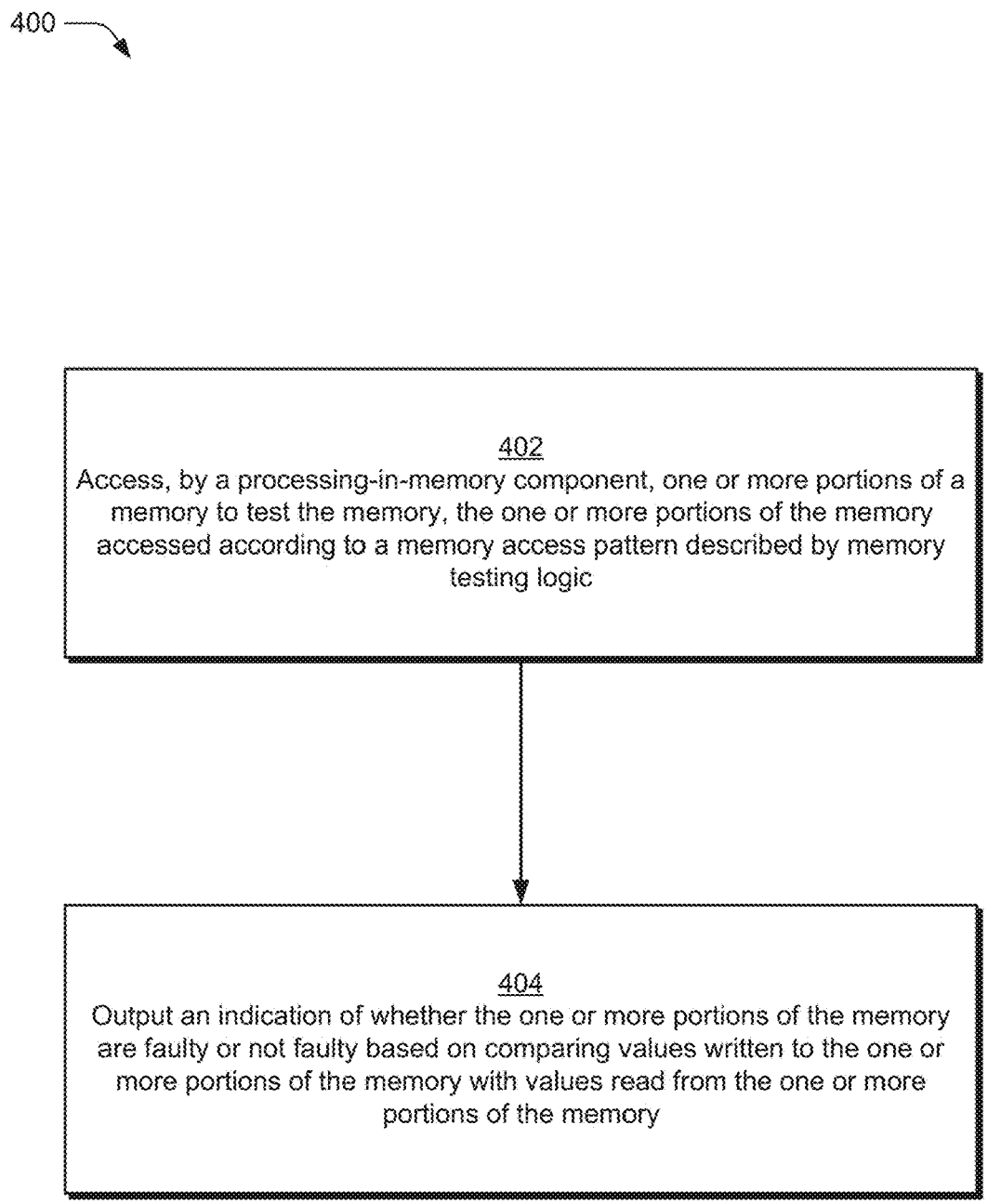
FIG. 4 depicts a procedure in an additional example implementation of memory verification using processing-in-memory.

FIG. 4 depicts a procedure 400 in an additional example implementation of memory verification using processing-in-memory.

One or more portions of a memory are accessed by a processing-in-memory component to test the memory, the one or more portions of the memory are accessed according to a memory access pattern described by memory testing logic (block 402). For example, the memory testing logic 114 includes instructions for testing the memory 110 in accordance with the with the administrative rules or policies that define when and how to verify operation of the memory 110. In one example, the processing-in-memory component 112 executes the instructions in the memory testing logic 114 which causes the processing-in-memory component 112 to verify operation of the one or more portions of the memory 110.

An indication is output of whether the one or more portions of the memory are faulty or not faulty based on comparing values written to the one or more portions of the memory with values read from the one or more portions of the memory (block 404). In some implementations, the processing-in-memory component 112 writes test values to the one or more portions of the memory 110 and reads values from the one or more portions of the memory 110. A portion of the one or more portions of the memory 110 is faulty if a test value written to the portion of is different from a value read from the portion. The portion of the one or more portions of the memory 110 is not faulty if the value read from the portion is a same value as the test value written to the portion.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102 having the core 108 and the memory module 104 having the memory 110 and the processing-in-memory component 112) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), one or more Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
 a memory of a memory module, the memory including memory testing logic; and
 an in-memory processor disposed in the memory module, the in-memory processor configured to receive the memory testing logic from the memory, execute the memory testing logic in the in-memory processor to test the memory, and output an indication of a detected fault based on testing the memory.

2. The system of claim 1, further comprising a host processor external to the memory module to execute one or more instructions to initiate a response to the detected fault.

3. The system of claim 1, wherein the memory testing logic is executed by the in-memory processor disposed in the memory module based on detection of an event or administrative rules for periodically verifying the memory.

4. The system of claim 1, wherein the memory testing logic uses a value determined based on whether the memory is idle to test the memory.

5. The system of claim 1, wherein the indication describes a location of a portion of the memory, a test value written to the portion of the memory, and a value read from the portion of the memory.

6. The system of claim 1, wherein the in-memory processor disposed in the memory module receives the memory testing logic from an externally-non-addressable bank of the memory.

7. The system of claim 1, further comprising an application or firmware configured to receive the indication without causing traffic between a host processor and the memory module and initiate a response to the detected fault based on the indication.

8. The system of claim 1, wherein the in-memory processor is configured to receive the memory testing logic from the memory without causing traffic external to the memory module and to execute the memory testing logic in the in-memory processor to test the memory without causing traffic external to the memory module.

9. The system of claim 8, wherein the in-memory processor is configured to output the indication of the detected fault without causing traffic external to the memory module.

10. The system of claim 1, wherein the memory module is a single integrated circuit device that incorporates the memory and the in-memory processor on a single chip.

11. The system of claim 1, wherein the memory module includes multiple chips that are vertically stacked together and implement the memory and the in-memory processor.

12. The system of claim 1, wherein the memory of the memory module is configured to communicate with a host processor core, and the in-memory processor is configured to verify operation of the memory in background with respect to the host processor core.

13. The system of claim 1, wherein the in-memory processor is configured to output the indication by writing the indication to a portion of the memory.

14. The system of claim 1, wherein the memory testing logic is available at a dedicated portion of the memory as fused logic.

15. A method comprising:
loading memory testing logic, from a memory of a memory module, into an in-memory processor disposed in the memory module;
executing, by the in-memory processor, the memory testing logic to test the memory; and
outputting an indication of a detected fault in the memory based on testing the memory.

16. The method of claim 15, wherein executing the memory testing logic to test the memory causes the in-memory processor disposed in the memory module to perform operations comprising:
writing, by the in-memory processor disposed in the memory module, a first value to a cell of the memory;
reading, by the in-memory processor disposed in the memory module, a second value from the cell of the memory; and
comparing, by the in-memory processor disposed in the memory module, the first value written to the cell of the memory with the second value read from the cell of the memory.

17. The method of claim 15, wherein the in-memory processor disposed in the memory module tests the memory according to a pattern of memory accesses described by the memory testing logic.

18. A method comprising:
accessing, by an in-memory processor disposed in a memory module, one or more portions of a memory of the memory module to test the memory, the one or more portions of the memory accessed according to a memory access pattern described by memory testing logic stored in the memory; and
outputting, by the in-memory processor, an indication of whether the one or more portions of the memory are faulty or not faulty for receipt by an application in the memory, the application configured to initiate a response based on the indication, the indication based on comparing values written to the one or more portions of the memory with values read from the one or more portions of the memory.

19. The method of claim 18, wherein the one or more portions of the memory are accessed by the in-memory processor disposed in the memory module based on at least one of administrative rules for periodically verifying the memory, detection of an event, or the memory being idle.

20. The method of claim 16, wherein the first value written to the cell of the memory is based on whether the memory is idle.

* * * * *